United States Patent [19]

Iino

[11] 4,071,220
[45] Jan. 31, 1978

[54] BALL VALVE

[75] Inventor: Tsuyoshi Iino, Nirasaki, Japan

[73] Assignee: Kitazawa Shoji Kabushiki Kaisha, Japan

[21] Appl. No.: 684,311

[22] Filed: May 7, 1976

[30] Foreign Application Priority Data

Sept. 25, 1975 Japan .................... 50-115882

[51] Int. Cl.² ............................................ F16K 5/20
[52] U.S. Cl. .................................... 251/174; 251/315
[58] Field of Search ............... 251/174, 315, 316, 317

[56] References Cited

U.S. PATENT DOCUMENTS

| | | | |
|---|---|---|---|
| 3,181,834 | 5/1965 | Jennings | 251/174 X |
| 3,387,815 | 6/1968 | Richards | 251/174 |
| 3,656,711 | 4/1972 | Toelke | 251/174 X |
| 3,760,833 | 9/1973 | Kemp | 251/174 X |

Primary Examiner—Robert G. Nilson
Attorney, Agent, or Firm—McNenny, Pearne, Gordon, Gail, Dickinson & Schiller

[57] ABSTRACT

A ball valve is provided including coupled outer casing elements adapted to enclose a rotationally movable valve body having an axial flow passageway therethrough. An annular casing groove having an anular seal member mounted therein is located adjacent each of the opposite ends of the flow passageway for sealingly engaging the movable valve body. Each of the annular casing grooves includes an annular casing wall projecting toward the movable valve body, and each of the seal members includes a flexible leg extending between its associated casing wall and movable valve body. A first surface of each flexible leg engages the movable valve body and a second, opposed surface of each leg is spaced a predetermined distance from its associated casing wall to accommodate a flexion of the flexible leg. Each of the seal members has a secondary sealing surface extending from the first surfaces thereof, and the secondary surfaces are spaced from the movable body a distance less than the foregoing predetermined distance. A spirally wound resilient member is carried in a recess in each of the seal members to bias the flexible legs into sealing engagement with the movable valve body and to urge the seal members into their associated annular casing grooves. Each of the annular casing walls also provides a further sealing surface adapted to engage the movable valve body upon failure of the seal members and axial displacement of the movable valve body toward the annular casing wall.

15 Claims, 6 Drawing Figures

BALL VALVE

BACKGROUND OF THE INVENTION AND PRIOR ART

The present invention relates to a ball valve intended to be mounted in a pipe line system for purposes such as opening, closing and conversion of a fluid flow path. The fluid flow path may be under a hydraulic pressure as in various pipe lines, or it may be for high pressure gas such as steam.

It is required that such ball valves be useful for years without leakage and mechanically easy to operate. Furthermore, there have arisen various requirements such that the ball valve itself should be safely exposed to a high temperature, particularly in emergencies such as fire, without losing the closure function of the valve due to melting of the valve seat when it is already in a closed condition. There have already been proposed improvements of such ball valves to achieve these requirements.

The foregoing requirements are more perfectly achieved by the present invention. More particularly, the manoeuvrability of the valve is improved, and the operating shaft is maintained free from leakage and the closure function is assured even when a sudden variation of the inner pressure and melting of the seal members under a high temperature as in a fire occur.

The improvement of manoeuvrability, which is substantially directed to facilitation in operation of a valve control lever, conflicts in principle with the improvement in the function of providing a sealed closure. To improve the sealed closure function, it is obviously essential that the seal members, which serve as valve seats between the outer casing and the spherical movable valve body accommodated in the outer casing, should be brought into close contact with these two elements. However, the imposition of a higher force for bringing the seal members into such close contact results in a higher friction which resists the external operation to rotate the movable valve body and thereby deteriorates the manoeuvrability of the valve.

Generally, for perfectly sealing a fluid at the sealing zone having a difference of pressure across the sealing zone, a pressure corresponding to the difference of pressure may be generated at the sealing zone. Further, there may be provided a structure extending transversely to the sealing zone to produce a sufficient pressure to achieve the desired sealing effect regardless of the relative area of the sealing zone. Accordingly, the manoeuvrability in opening and closing the valve may be improved while maintaining a high function of sealing closure when the structure is so arranged to reduce the area of the sealing zone while maintaining the necessary and sufficient pressure upon the sealing zone.

In practice, however, the pressure difference of the fluid in the flow path is influential not only across each seal member but also upon the entire surface of the spherical valve body of the ball valve so that the load on the valve in the flow path remains substantially constant. Accordingly, reduction in the area of the sealing surface results in an increase of the load per unit area on the sealing surface, which is determined by the load in the flow path and an increase of the frictional force. According to the fundamental rule of mechanics, a frictional force is expressed by a product of a load vertically exerted on the friction surface and a frictional coefficient of the friction surface independent of the area of the friction surface. It is apparent from the foregoing consideration that this fundamental frictional consideration is applicable so far as the load on the valve within the flow path remains constant, and that no improvement of the manoeuvrability for opening and closing of the valve can be achieved merely by modifying the design of the friction surface in an ordinary procedure such as that previously described.

Fluorocarbon polymers such as ethylene tetrafluoride and ethylene trifluoride, which have commonly been used as the materials in ball valves of the type described herein, have properties and characteristics which render the materials particularly useful in such applications. These polymers are, for example, remarkably stable in their chemical aspects. Specifically, they have no tendency to react with other materials which would, as a result, stick fast to these polymers and resist relatively high and low temperatures.

Fluorocarbon polymers are also advantageous in that they are low friction materials which provide a low friction characteristic even under solid state friction as in static friction conditions approximated during a low velocity operation at which it is difficult for the other materials to be subjected to an effective lubrication. In contrast, other materials may only provide such a low friction characteristic during a high velocity operation and with the presence of a lubricant on the friction surface.

A further important advantage of the fluorocarbon polymers is their characteristic curve which represents the frictional force with respect to variation in the load exerted upon the friction surface. Most materials have characteristic curves which are linear and which do not deviate from the fundamental rule of mechanics as previously mentioned. However, the fluorocarbon polymers provide a load-friction characteristic curve wherein the frictional force linearly increases in proportion to the load as the load increases to a predetermined level, at which point it begins to curve toward the load axis as the load further increases, and, thereafter, the curve reassumes its linearity, substantially in parallel with the load indicating axis.

If it is possible for the foregoing particular properties and characteristics of the fluorocarbon polymers to be advantageously utilized, the sealing function of the ball valve as well as the manoeuvrability for opening and closing the valve may be effectively improved. However, the fluorocarbon polymers have another mechanical property or characteristic which is disadvantageous for valve seat materials, especially valve seats having a small contact area. Namely, they display undesirable mechanical strength characteristics, especially mechanical rigidity. More specifically, a prolonged bending deformation results in a permanent distortion. This is believed to be explained by reason of creep which is often observed in the other materials at a relatively high temperature and which is also observed in the fluorocarbon polymers at a relatively low temperature. Accordingly, it has been impossible in seal members formed of fluorocarbon polymers to reduce the contact area beyond a given limit from the viewpoint of strength. This problem may be overcome by taking advantage of the characteristic of the fluorocarbon polymers that they are more resistant to a compressive load than to a bending load. Thus, it is principally the bending load that causes a permanent distortion in the fluorocarbon polymers due to creep, and this problem may be overcome by reducing the permanent distortion by applying a load in opposition to the bending load and, as a result, converting the bending stress in the polymers principally into a compressive stress.

According to the present invention, as described hereinabove, the advantageous properties or characteristics of fluorocarbon polymers in ball valve applications are obtained and the disadvantages of such polymers are compensated to the desired ball valve. Further, a ball valve is provided which is not only optimal in the manoeuvrability but also maintains the sealing function even at a high temperature as in emergencies such as fire. It is also possible to employ, if desired, the well known procedure in which the wear-resistance of the fluorocarbon polymers is substantially improved by mixing suitable filler therewith.

In a specific arrangement according to the present invention, each seal member is provided with a space into which the seal member may be displaced as a stress is exerted on the seal member during operation thereof to minimize wear and accommodate a flexion of the seal member. In addition, each seal member includes an annular expansive resilient member spirally wound around itself which is adapted to propagate a desired contact force when the movable valve body occupies a position at which the valve is closed. A particular function thereof, as will be described more in detail later, is to reduce the area over which the movable valve body comes in close contact with the seal members and thereby reduces substantially by one-half the torque required on the operating lever to operate the valve.

Generally, the hole extending through the movable valve body in a ball valve to establish a continuous flow path is brought into communication with the interior space of the outer casing which surrounds the valve body as the movable valve body is rotated during valve operation. Accordingly, the fluid being conveyed enters into the space defined between the movable body and the outer casing, and it remains entrapped therein while the valve is in a closed condition. The entrapped fluid is expanded with a corresponding increase in pressure when exposed to a high temperature. The entrapped, high pressure fluid has no refuge adapted to accommodate the expanded amount thereof, and it is prevented by the seal members, when the valve is closed, from returning into the initial flow path. Thus, the expanded fluid breaks the fluid seal or water-tightness established around the valve operating shaft mounted in the outer casing and jets out along the operating lever to the exterior. This problem is also overcome, according to the present invention, by utilizing the space serving as the refuge in a manner which allows the expanded amount of the fluid to return to its initial flow path.

With the arrangement according to the present invention, a variation of the inner pressure which occurs under normal conditions within the valve is effectively dealt with by the space adapted to accommodate a flexion of each seal member and the annular expansive resilient member adapted to act upon this space. More particularly, an impact due to an inner pressure variation of the type which often occurs in opening and closing of the movable valve body is resisted to avoid any damage of the valve.

The type of ball valves contemplated herein can be employed in pipe lines or systems which may be exposed to a high temperature as in fire, and the seal member which also serves as the valve seat may be damaged due to melting under such a high temperature condition. As a result thereof, the inner pressure exerted on the movable valve body at its closing position crushes the seal member and prevents it from functioning as a seal. Although the ball valve can not be reused once the seal members have been damaged due to melting, at least the desired sealing function is maintained in accordance with the present invention even though the ball valve may be damaged to an extent such that the valve can not be otherwise reused as a normally functioning valve. In accordance with the present invention, the arrangement of the seal members is designed in the light of this aspect as well as the need to provide easy manoeuvrability, manageability of expanding pressure and a structure compatible with inner pressure variation.

BREIF DESCRIPTION OF THE DRAWINGS

DETAILED DESCRIPTION OF THE DRAWINGS

Figure 1:
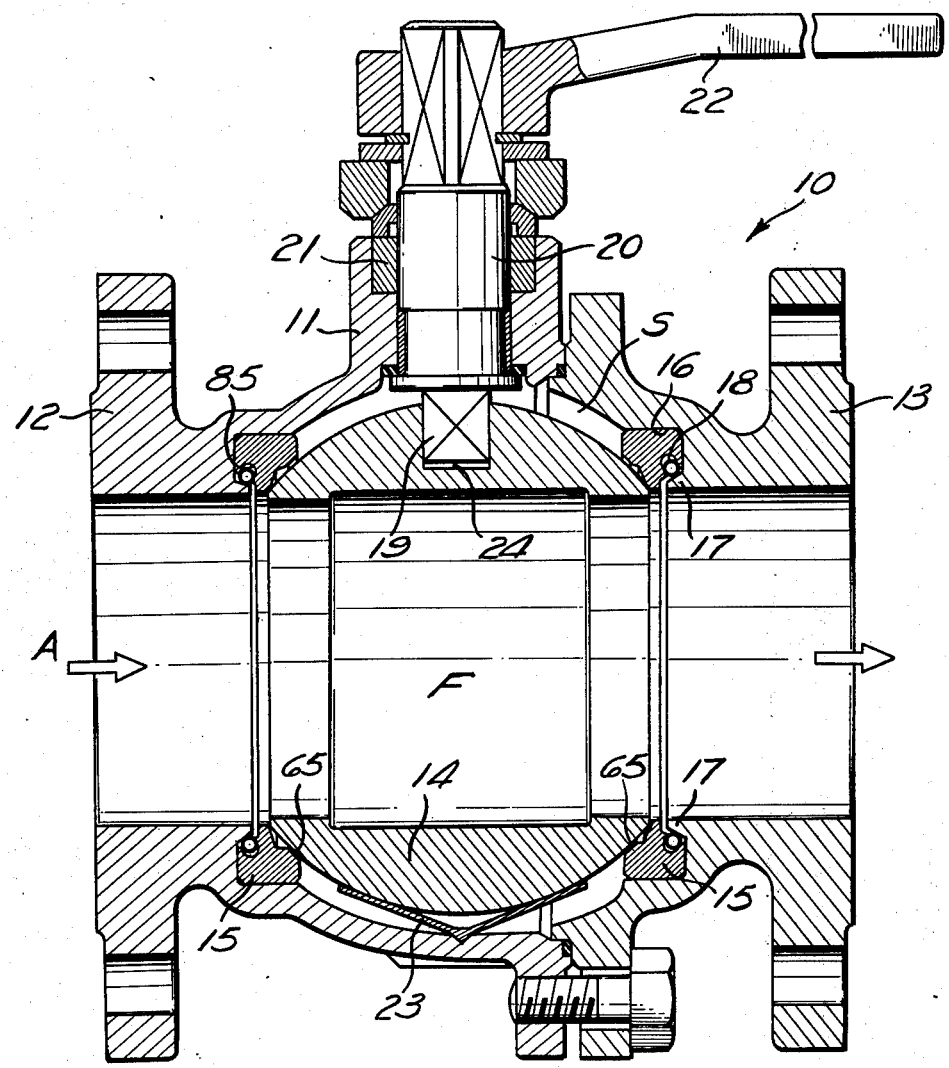
FIG. 1 is an axial section of a ball valve in accordance with the present invention.
Figure 2:
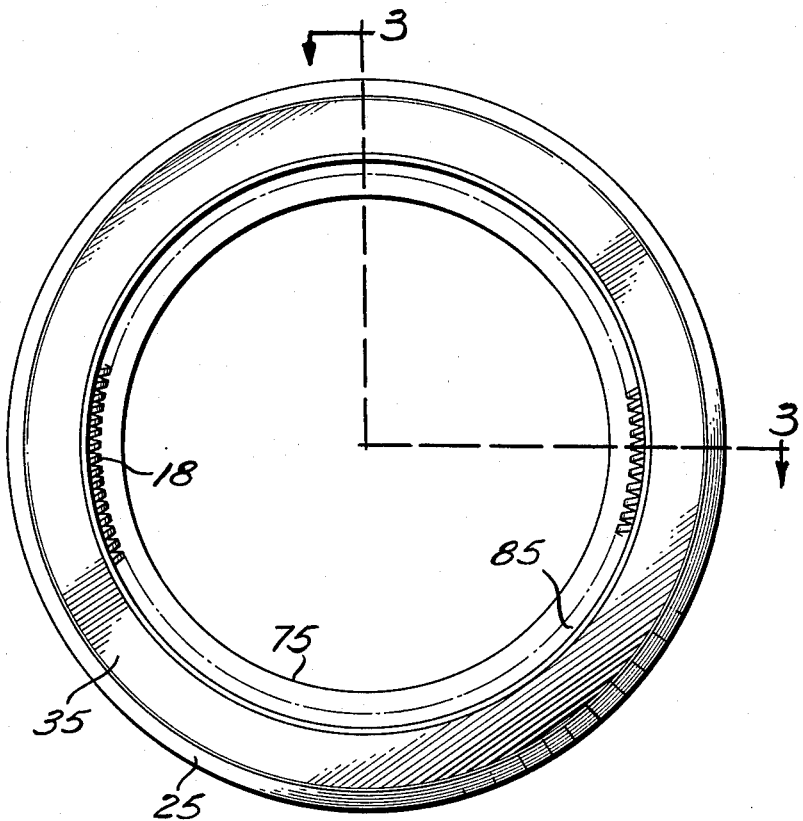
FIG. 2 is an enlarged front view showing a seal member employed as a valve seat in the ball valve shown in FIG. 1 together with an expansive resilient member incorporated therein.
Figure 3:
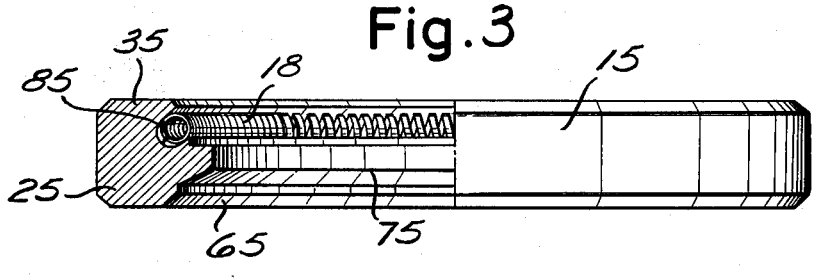
FIG. 3 is a plan view partially in section taken along a line 3 — 3 in FIG. 2.
Figure 4:
FIG. 4 is a plan view showing the expansive resilient member.

Referring to FIGS. 1 to 5, a preferred embodiment of a ball valve 10 is shown. The ball valve 10 includes an outer casing 11 comprising two outer casing parts 12 and 13 between which a movable valve body 14 having a spherical surface is held. A pair of identical seal members 15, 15' are arranged between the movable valve body 14 and the outer casing parts 12 and 13, respectively. The seal members 15, 15' serve as valve seats adapted to intercept the movable valve body 14 from the outer casing part 11 with a sealing effect such that the movable valve body 14 effectively intercepts the upstream side from the downstream side with respect to a flow path generally designated F. It is assumed here that the flow in the flow path F is directed in a direction indicated by an arrow A in FIG. 1.

The movable body 14 is rotated by means of a square shaft 19 extending from a shaft 20 which is journaled in the outer casing 11 by a seal member 21. The operating shaft 20 is provided at its upper end with a lever 22 serving as an operating handle in a known manner. The square shaft 19 is received within a square opening or recess 24 in the upper portion of the movable valve body 14 to provide rotation thereof and valve operation upon movement of the lever 22. A conical Belleville spring 23 is arranged to support the load of the movable valve body 14 and to reduce the frictional resistance due to the load during the operation of the movable valve body 14. Thus, the Belleville spring 23 facilitates operation of the movable valve body 14.

According to the present invention, annular casing grooves 16, 16' are formed in the inner peripheries of the outer casing parts 12 and 13, respectively, to receive the associated seal members 15, 15'. Each of the seal members 15, 15' is provided with an associated annular expansive resilient member 18, 18'. The corresponding seal members 15, 15', grooves 16, 16' and resilient members 18, 18' are identical in structure and only the parts 15, 16 and 18 will be described in detail, it being understood that the corresponding parts haivng prime designations are the same.

The annular groove 16 has a "substantially" angular, U-shaped cross-section in the radial direction. The term "substantially" is used here since an inner slant wall 26 provided by an annular edge or casing wall 17 of the annular groove 16 is deeper than an outer peripheral wall 46, and the inner wall 26 is slightly slanted outwardly so that the wall 26 is not parallel to the axis of the flow path F but forms a part of a conical surface having its apex on the axis of the flow path overlying the radial extent of the movable valve body 14. The formation of the annular groove 16 by working such as machining so as to leave the corresponding annular edge 17 surrounding the flow path F is certainly more troublesome than formation of annular steps each having an L-shape in cross-section as taken in radial direction and providing no annular edge around the flow path F. The particular configuration of the annular groove 16 is, however, important in order to be adapted for a particular arrangement of the seal member 15 as described later.

The annular edge 17 includes a concave spherical surface 27 in conformity with or having the same radius of curvature as the spherical surface defined by the movable valve body 14. The configuration of the annular edge 17 enables the closing function to be obtained as rapidly as possible in response to a high temperature generated by emergencies such as fire in which the seal member 15 melts. Practically, it is preferred to increase the projecting extent of each annular edge 17 so that the concave spherical surface 27 is reasonably close to the outer surface of the movable valve body 14.

The formation of the concave spherical surface 27 along the annular edge 17 is more difficult than the formation of the corresponding prior art structures. However, the particular arrangement of these portions is important to provide the unique effect according to the present invention in connection with the particular arrangement of the seal member 15 as will be described in greater detail below.

The seal member 15, as a whole, presents an annulus (FIGS. 2 and 3) having an outer peripheral wall 25 and a top wall or outer end surface 35. The walls 25 and 35 are shaped to respectively provide close contact with the outer peripheral wall 46 and a machined annular bottom wall 36 of the annular groove 16 as shown in FIG. 5.

Figure 5:
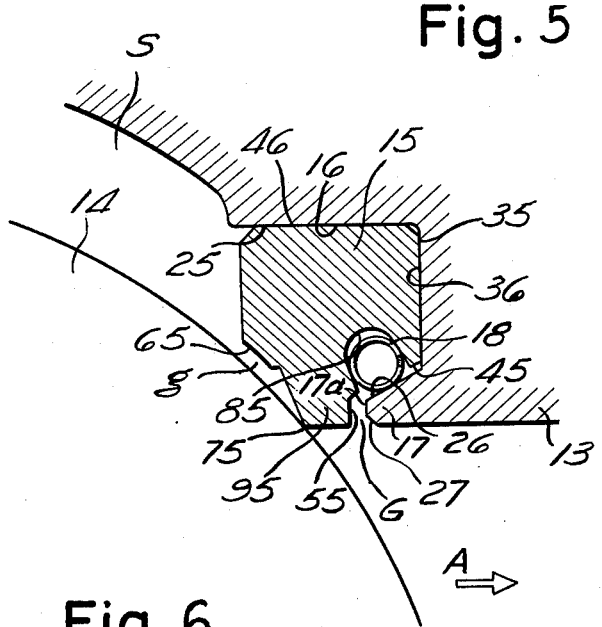
FIG. 5 is a fragmentary sectional view on an enlarged scale showing the manner in which the movable valve body of the ball valve shown in FIG. 1 comes in contact with the seal member and the mounting of the seal member in the outer casing.

It is preferred that the radial width of the top wall or outer end surface 35 of the seal member 15 is slightly narrower than the width of the annular wall 36 as shown in FIG. 5 so as to leave a slight gap between the seal member 15 and the annular edge 17 so that the seal member 15 may be easily introduced slidably along the slant wall 26 into the annular groove 16. However, this requirement is not necessarily essential to the present invention.

The inner peripheral wall continuously extending from the outer end surface 35 of the seal member 15 provides a conical slant wall 45 which is slightly spaced from a conical slant wall 26 of the annular groove 16 at the position in which the seal member 15 is received in the annular groove 16. An inner bottom wall 55 of the slant wall 45 is dimensioned so as to be spaced by a gap or predetermined distance G from the projecting tip 17a of the annular edge 17.

The seal member 15 includes an annular concave wall 65 opposed to the outer end surface 35. The annular concave wall 65 is spaced by a slight gap or distance $g$ from the movable valve body 14 when the seal member 15 is received in the annular groove 16. The annular concave wall 65 is formed, just as the concave spherical surface 27 of the annular edge 17, in conformity with the spherical surface of the movable valve body 14. It is desired then that the gap $g$ which is provided between the seal member 15 and the movable valve body 14 when the ball valve 10 is assembled be smaller than the gap G defined between the projecting tip 17a of the annular edge 17 and the inner bottom wall 55 of the seal member 15.

An annular angle portion 75 extending along the inner peripheral wall of the seal member 15 is continuous with respect to the annular concave wall 65, and it is brought about into a partial contact with the spherical surface of the movable valve body 14 as the seal member 15 is engaged as the valve seat for the movable valve body 14. Accordingly, the flow path F in the outer casing 11 is intercepted from a space S in which the movable valve body 14 is accommodated by the outer casing 11.

The seal member 15 also includes an annular groove or recess 85 in which the expansively resilient member 18 is forcibly engaged. The expansively resilient member 18 is spirally wound around itself and presents as a whole an annulus in conformity with the annular groove 85. With the seal member 15 received in the annular groove 16, the annular groove 85 is opposed to the slant wall 26 of the annular edge 17, and it extends in a direction transverse or substantially transverse to a slant line or a generating line shown in FIG. 5 as the slant wall 26. The relative disposition or particular directivity of the annular groove 85 is advantageous, as will be described later, in that the resilient member 18 effectively acts upon the correspondingly annular angle edge 75 of the seal member 15.

The annular expansive resilient member 18 comprises a rust-proof metal wire such as stainless steel wire which is closely wound around itself in a spiral having a predetermined spiral diameter in its no load state. The groove width of the annular groove 85 formed in the seal member 15 is slightly smaller than the spiral diameter of the member 18. Accordingly, the annular resilient member 18 is forcibly engaged into the annular groove 85 under a considerably high external pressure, and the member 18 thus forcibly engaged into the groove has its cross-section slightly flattened to a somewhat non-circular cross-sectional configuration. The slant wall 26 formed along the inner side of the annular edge 17 facilitates the engagement of the member 18 into the annular groove 85.

As previously indicated, it is preferred that the annular edge 17 project as far as possible toward the movable valve body 14 so that a sealed interception may be rapidly restored if the seal member 15 is damaged due to a high temperature condition. At the same time, an annular flexible edge or leg 95 provided by the seal member 15 has its width, as measured along the flow path F, as narrow as possible in view of the desired relationship between the gap G and the gap $g$ to assure the rapid restoration of sealed interception in response to damage of the seal member 15. However, if the flexible edge 95 is provided with too narrow of a width along the flow path, it would reduce the force at which the flexible edge 95 comes in contact with the movable body 14 under its self-support effect or arising due to the resiliency and self-supporting effect of the flexible edge 95 itself. As discussed above, the most important parts of the ball valve 10 according to the present invention should be designed, therefore, with regard to all the aspects as mentioned above and in accordance with the practical application of the valve itself.

Figure 6:
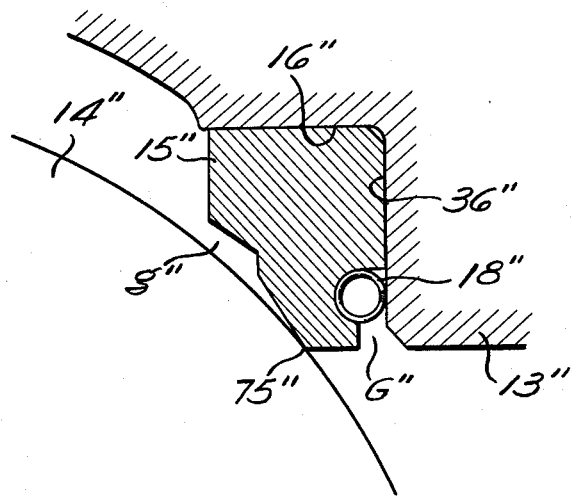
FIG. 6 is a fragmentary view similar to FIG. 5 showing another embodiment of a seal member in accordance with the present invention.

Referring to FIG. 6, another embodiment of the present invention is shown. For purposes of convenience, the corresponding parts of this embodiment have been similarly numbered with the addition of double prime designations. In this embodiment, a seal member 15″ having a modified cross-sectional configuration is arranged so that an annular resilient member 18″ positively exerts a pressure upon the rear surface of the seal member. The resilient member 18″ is in direct contact with an annular seat support surface 36″ formed on the outer casing 13″. The outer casing 13″ is of the conventional type in that no annular edge 17 is provided along the annular seat support 36″. An annular angle edge 75″ is urged from the rear side by the resilient member 18″ into frictional contact with the movable valve body 14″. A bending stress exerted by the annular angle edge 75″ of the seal member 15″ upon the member 15″, as in the previous embodiment of FIGS. 1 to 5, is reduced by a compressing effect of the resilient member 18″ exerted from the rear side so that most of the bending stress is effectively imposed as a compressing force exerted between the valve body 14″ and the resilient member 18″. Accordingly, the embodiment of FIG. 6 relies upon, instead of the conventional measure by which the bending stress is dispersed by increasing the thickness of the seal member itself, an arrangement wherein the resilient member 18″ exerts a sufficient pressure upon the sealing surface to reduce the area of frictional contact.

The manner in which the ball valve according to the present invention and the individual parts thereof operate will now be described with particular reference to the embodiment of FIGS. 1 to 5. The ball valve 10 according to the present invention is advantageous, first of all, in that the combination of the seal member serving as the valve seat and the improved arrangement of the seat support surface improves the controllability of the valve and maintains a relatively high ability of sealing interception. Specifically, the movable valve body 14 upon operation moves into the annular edge 75 and contact with the seal member 15, and a pressure required to achieve this contact is provided by the annular expansive resilient member 18 which is forcibly engaged in the annular groove 85 formed in the seal member 15 and thereby exerts a pressure upon the annular flexible edge 95 of the seal member 15 from the rear side thereof. In this manner, the seal member 15 is prevented from deformation and damage, and it is held in close contact with the body 14 to provide the desired sealing function. More specifically, the annular resilient member 18 which is forcibly engaged into the annular groove 85 in a flattened state exerts pressure through one of opposite annular walls of the annular groove 85 upon the outer surface of the movable valve body 14 by the annular angle edge 75 and through the other of opposite walls upon the annular bottom wall 36 of the outer casing by the outer end surface 35 and exerts a component of the pressure upon the outer peripheral wall 46 by the peripheral edge 25 to effect the desired sealing interception. Although the seal member 15 is progressively worn as the movable valve body 14 slides in frictional contact with the seal member 15 during operation of the ball valve and possible damage such as a partial surface deformation of the seal member 15 may occur, such wear and damage is compensated for at once by the potential pressure exerted by the annular expansive resilient member 18. Specifically, the member 18 acts through the flexible edge 95 from its rear side upon the movable valve body 14 to maintain a superior function of sealing interception during closure of the valve and to assure a durability for many years. Further, the precision with which the movable valve body 14 is surface worked, the precision with which the movable valve body 14 is incorporated relative to a position at which the seal member 15 serving as the valve seat is carried and the precision with which the operating shaft 20 is mounted in the movable valve body 14 are not critical to maintain the desired sealing function, since the sealing surface of the seal member 15 can adjust itself to possible damage or deformation.

Wear on the portions which come in contact with each other and error of the position at which the movable valve body 14 is held tend to be progressively increased as operation of the valve is repeated. In the ball valve according to the present invention, however, the annular flexible edge 95 is freely flexible within the extent of the gap G defined between the annular flexible edge 95 and the projecting end of the annular edge 17 to absorb the propagated pressure while maintaining the desired close contact.

It has been experimentally found that the force required to be exerted on the lever 22 for effective operation of the valve according to the present invention which achieves a superior sealing interception with a small area of contact is less than one half of the force required in a prior art ball valve which is made of similar materials but includes neither the annular flexible edge nor the annular expansive resilient member. In a comparison of 2-inch size ball valves, for example, it has been experimentally found that the embodiments of the present invention are remarkably superior in operating torque characteristics to those of prior art as shown by the following test results summarized in Table I.

TABLE I

| Internal pressure in flow path | Torque To Operate Valve (kg-cm) | |
| --- | --- | --- |
| | Embodiments of the invention | Ball valves of the prior art |
| no load | 85kg - cm | 220kg - cm |
| 2kg/cm$^2$ | 90kg - cm | 240kg - cm |
| 5kg/cm$^2$ | 95kg - cm | 230kg - cm |
| 8kg/cm$^2$ | 100kg - cm | 230kg - cm |
| 10kg/cm$^2$ | 120kg - cm | 230kg - cm |

As shown in Table I, it has been found that prior art ball valves require a substantially constant torque for operation, and that the prior art torque valve for operation is independent of the load due to the inner pressure in the flow path. In contrast with the prior art ball valves, the ball valves of the present invention require approximately ⅓ of the substantially constant prior art torque valve for operation under no load, and approximately ½ of the prior art torque value for operation even at the upper limit of the inner pressure which is usually employed, although the torque for operation progressively increases as the inner pressure in the flow path increases.

Now a second feature in the performance of the ball valve according to the present invention will be described. As previously indicated, the fluid which is being conveyed through the valve enters into the operation space S when the valve is opened or closed by rotation of the movable valve body 14. The fluid entering the space S is entrapped and expanded to an increased pressure when the movable body is retained in the closed position and the entrapped fluid is exposed to a high temperature due to thermal causes such as a regional cause or a climatic cause peculiar to the place at which the valve is installed. Even in this situation, the entrapped fluid is prevented according to the present invention from breaking the sealing effect of the fluid or water-tight members provided between the operating shaft 20 and the outer casing 11 and thereby jetting out around said shaft 20. Specifically, the increasing pressure of the expanding fluid within the operating space S overcomes the resiliency of the annular expansive resilient member 18 and the self-supporting ability of the annular flexible edge 95 itself to enter into the flow path F. In this manner, the sealing function of the fluid or water-tight mechanism provided around the operating shaft 20 is improved to a predetermined level, and the fluid which should flow only through the flow path and be intercepted by the movable valve body 14 is prevented from jetting out through around the operating shaft 20. Accordingly, the maintenance of security around the operating shaft 20 is thus assured without damage to the operating shaft 20.

The ball valve 10 according to the present invention is provided with the gap G between the annular flexible edge 95 of the seal member 15 and the projecting tip of the annular edge 17 which serves together with the flexibility of the annular flexible edge 95 to avoid damaging the valve independent of the position occupied by the movable valve body 14. This is especially useful in protecting against a sudden and drastic variation in the inner pressure of the fluid when the movable valve body 14 is moved to the closed position or against a shock wave which often occurs in opening or closing of the movable valve body 14. In such a case, a strong instantaneous force in the direction of the arrow A in FIG. 1 acts upon the movable valve body 14. Although the movable valve body 14 is shown as opening the flow path in FIG. 1, the force acting upon the movable valve body 14 further increases when the latter is moved to its closed position. Thus, the movable valve body 14 is urged from the upstream side toward the downstream side and thereby bends the annular flexible edge 95 against the potential pressure of the annular expansive resilient member 18 and the self-supporting ability of the annular flexible edge 95. As a result thereof, the resilient member 18 is flattened by the flexion of the flexible edge 95 under the action of the movable valve body 14. However, the flexion of the flexible edge 95 results in contraction of the gap G between the flexible edge 95 and the projecting tip 17a of the annular edge 17 so that the spherical surface of the movable valve body 14 is urged against the spherical concave surface 65 of the seal member 15 before the flexible edge 95 comes into contact with said projecting tip 17a of the annular edge 17. Thus, an instantaneous movement of the movable valve body 14 is supported by the contact surface defined by the circumferential surfaces of the concave surface 65 and the annular angle edge 75. The gap g defined between the circumferential concave surface 65 and the outer spherical surface of the movable valve body 14 is selected smaller than the gap G defined between the annular flexible edge 95 and the annular edge 17 so that the supporting effect may be assured, and the seal member 15 may reassume its original configuration as the pressure shock is damped.

When the ball valve 10 according to the present invention is exposed to a high temperature as in fire, the seal member 15 formed of a fluorocarbon polymer melts at this high temperature and loses its original rigidity. Thus, the inner pressure within the flow path forces the movable valve body 14 toward the downstream side, and the seal member 15 may completely fail to provide its original sealing function. Even in such a situation, however, the movable valve body 14 is supported by the concave spherical surface 27 formed in the annular edge 17 so as to maintain the interception function between the upstream side and the downstream side with respect to the movable valve body 14. Thus, it is assured that the flow path is maintained closed both in cases where the ball valve is closed as in view of an emergency such as a fire and where the ball valve has already been closed before the occurrence of the emergency. As previously mentioned, the concave spherical surface 27 is formed along the tip of the annular edge 17 at a position as close as possible to the outer surface of the movable valve body 14 so that the desired function of sealing may be instantaneously taken over by the concave spherical surface 27 when the contact function of the seal member 15 is lost.

The ball valve according to the present invention, as mentioned hereinabove, advantageously achieves the various objects as enumerated in the beginning of this specification, and, compared to the ball valve of prior art, provides remarkably improved performance and effect when installed in a pipe line system.

Obviously, it should be understood that the embodiments as shown are illustrated and described merely by way of example and many variants or modifications are possible within a scope of the invention.

What is claimed is:

1. A ball valve comprising an outer casing which consists of a plurality of parts and accommodates therein a movable valve body having a flow path therethrough, a valve operating shaft journaled in said outer casing and arranged to rotate said movable valve body, and annular seal members interposed between said movable valve body and said outer casing and serving as valve seats for said movable body, each of said seal members including an annular groove extending so as to surround said flow path through said movable body, each of said annular grooves forming an annular flexible edge which is urged against a spherical surface of said movable valve body, and an annular expansive resilient member associated with each of said seal members, each of said annular expansive resilient members being spirally wound around itself and forcibly engaged into said annular groove of its associated seal member to exert a pressure through said annular flexible edge upon said movable valve body while urging an outer end surface of its associated seal member against an annular bottom wall of an annular casing groove provided in said outer casing.

2. A ball valve according to claim 1 wherein each of said annular grooves of said seal members has a groove width slightly smaller than the outer spiral diameter of said annular expansive resilient member.

3. A ball valve according to claim 1 wherein each of said annular flexible edges provided by each of said seal members includes an annular angle edge along the inner end thereof contacting said spherical surface of said movable valve body, and each of said seal members includes an annular concave surface extending from its annular angle edge and spaced from said spherical surface of said movable valve body, each of said annular concave surfaces having substantially the same spherical surface configuration as that of said spherical surface of said movable valve body.

4. A ball valve comprising an outer casing which consists of a plurality of parts and accommodates therein a movable valve body having a flow path therethrough, a valve operating shaft journaled in said outer casing and operably arranged to rotate said movable valve body, annular seal members interposed between said movable body and said outer casing serving as valve seats for said movable body, at least one seat formed in said outer casing and extending around said flow path for supporting an associated one of said seal members, said one seat including an annular edge projecting from the inner periphery of said outer casing in the direction of said flow path and toward said movable valve body, said associated seal member having an annular groove extending around said flow path, said annular groove of said associated seal member forming an annular flexible edge which is partially urged against a spherical surface of said movable valve body, so that a potential resilience of an annular expansive resilient member which is spirally wound around itself and forcibly engaged into said annular groove exerts a pressure through said annular flexible edge upon said movable valve body while urging an opposed outer end surface of said associated seal member against an annular bottom wall formed in said one seat provided in said outer casing.

5. A ball valve according to claim 4 wherein said annular edge of said one seat is spaced from said annular flexible edge of said associated seal member to accommodate a flexion of said annular flexible edge.

6. A ball valve according to claim 4 wherein said annular edge of said one seat includes a surface slanted in the direction along which said associated seal member is engaged into said one seat.

7. A ball valve according to claim 4 wherein said annular edge of said one seat provides a concave spherical surface for supporting said movable valve body upon displacement thereof in the direction of said flow path.

8. A ball valve according to claim 4 wherein said annular edge of said one seat includes a surface slanted in the direction along which said associated seal member is engaged into said one seat and said annular groove formed in said associated seal member extends transverse to said slanted wall.

9. A ball valve according to claim 4 wherein said annular edge of said one seat is spaced from said annular flexible edge of said associated seal member a first predetermined distance to accommodate a flexion of said flexible edge, said annular flexible edge includes an annular angle edge for contacting said movable body, said associated seal member includes an annular concave spherical surface extending from said annular angle edge and having the same radius of curvature as said spherical surface of said movable body, and said annular concave spherical surface is spaced a second predetermined distance from said movable body smaller than said first predetermined distance.

10. A ball valve according to claim 9 wherein said annular flexible edge of said associated seal member has a sufficient thickness as measured in the direction of said flow path to be maintained in contact with said spherical surface of said movable valve body under a self-supporting effect, said annular edge of said one seat includes a concave spherical surface adapted to engage said movable body upon relative displacement thereof in the direction of said flow path, and said annular edge of said one seat projects toward said movable valve body so that said movable valve body and said concave spherical surface provided by said annular edge to support said movable valve body may be arranged adjacent to each other.

11. A ball valve comprising an outer casing which consists of a plurality of parts and accommodates therein a spherical movable valve body, a valve operating shaft journaled in said outer casing operably arranged to rotate said movable valve body and annular seal members interposed between said movable body and said outer casing serving as valve seats for said movable body, each of said seal members being made of a fluorocarbon polymer and having an annular angle edge along which the seal member is urged against said movable valve body, a metal annular expansive resilient member which is spirally wound around itself disposed adjacent the rear side of each of said seal members to urge said annular angle edge against said movable valve body, and annular seat surfaces formed in said outer casing to respectively support an associated one of said seal members and to cooperate with an associated one of said metal annular expansive resilient members so as to exert a pressure upon said rear side of said associated seal member as well as upon said seat surface.

12. A ball valve according to claim 11 wherein bending stresses imposed upon said annular angle edge of each of said seal members by a force exerted by said movable valve body thereupon are converted into corresponding compressive stresses by a force exerted by each of said associated annular expansive resilient members from the rear side of said annular angle edges of each of said seal members.

13. A ball valve comprising an outer casing which consists of a plurality of parts and accommodates therein a movable valve body having a spherical outer surface and an axially extending opening therethrough for providing a fluid flow path, a valve operating shaft journaled in said outer casing and operably arranged to rotate said movable valve body, an annular casing groove provided in said outer casing having an annular seal member mounted therein for sealingly engaging said movable valve body around said opening therethrough, said annular casing groove including an annular casing wall projecting toward said movable valve body, said seal member including an annular flexible leg extending between said movable valve body and said annular casing wall of said annular casing groove, said annular flexible leg having a first surface thereof engaging said movable valve body and an opposed second surface thereof spaced a predetermined distance from said annular casing wall of said annular casing groove, said seal member also including an annular recess having an annular expansive resilient member mounted therein for biasing said first surface of said annular flexible leg against said movable valve body and simultaneously urging said annular seal into said annular casing groove.

14. A ball valve as set forth in claim 13 wherein said annular seal member includes a concave spherical seal surface extending from said first surface of said annular flexible leg, said concave spherical seal surface having substantially the same radius of curvature as said spherical outer surface of said movable valve body and being spaced therefrom a distance smaller than said predetermined distance.

15. A ball valve as set forth in claim 13 wherein said annular casing wall provides a concave spherical wall surface adapted to sealingly engage said spherical outer surface of said movable valve body upon failure of said annular seal member and axial relative movement of said movable valve body toward said annular casing wall.

* * * * *